March 24, 1964 J. H. McGUIGAN 3,126,527

MAGNETIC CORE MEMORY CIRCUITS

Filed March 3, 1958

INVENTOR
J. H. McGUIGAN
BY
William H. Kamstra
ATTORNEY 3,126,527
MAGNETIC CORE MEMORY CIRCUITS
John H. McGuigan, Berkeley Heights, N.J., assignor to Bell Telephone Laboratories, Incorporated, New York, N.Y., a corporation of New York
Filed Mar. 3, 1958, Ser. No. 718,585
16 Claims. (Cl. 340—174)

This invention relates to information storage circuits and particularly to magnetic information storage cells and memory matrices utilizing such storage cells as basic units.

In the magnetic information storage and processing art the problem is presented generally of rewriting an information bit back into a storage cell from which it has been erased by the reading operation. In magnetic information storage circuits generally an information value is represented in a storage cell by a particular condition of remanent magnetization of the magnetic element comprising the cell and is read by switching or reversing that condition of magnetization. The value is thus obviously destroyed by the act of interrogating it. This problem is frequently met by providing circuitry to restore an information value to the magnetic element in which it was originally contained by restoring the element to the particular magnetic condition representing the value read out. In some cases virtually simultaneous rewriting of an information value is achieved and the total read and rewrite time is thus greatly reduced. Such an arrangement is described, for example, in my copending application Serial No. 603,010, filed August 9, 1956, now U.S. Patent No. 3,016,521, granted January 9, 1962. Although in such a case the total time for a read-rewrite cycle is reduced, a separate rewrite step is still required. Other means of solving the problem of the destruction of information include the application of special geometries in the storage cells themselves. Such special geometry arrangements generally involve conventional toroids having additional apertures associated with the main aperture of the toroid. Hodever, such arrangements introduce complexities in the manufacture of the toroids and are unattractive from an economy viewpoint when large-scale memories are to be constructed.

Accordingly, it is an object of this invention to accomplish the storage of an information value in a new and novel manner in which the value is not destroyed in the operation of interrogating it.

It is another object of this invention to provide a new and novel magnetic storage cell capable of storing an information bit and retaining that bit during the interrogating operation.

Another object of this invention is the non-destructive storage of a large number of binary information values by means of a magnetic memory matrix having as its basic unit a new and novel storage cell.

A still further object of this invention is the provision of a new and novel magnetic memory matrix having a non-destructive read out, lending itself to simpler methods of fabrication, and not being dependent upon the conventional coincidence of currents for its operation.

The above and other objects of this invention are realized in a magnetic memory matrix having as its basic storage unit a cell comprising a first and a second magnetic core of the well-known "square loop" type. Each of the cores has two windings inductively coupled thereto; the first winding of each core being included respectively in a branch of a two-branch energizing circuit. The second winding of the first core is connected to a source of bias current and the second winding of the second core is connected to a read-out circuit. Each core is capable in the conventional manner of assuming two distinct conditions of remanent magnetization and thus each cell is capable of four different states as determined by the combinations of particular remanent conditions of the cores. For purposes of describing an illustrative embodiment of this invention two of the four available states are utilized to represent information in the binary system of notation. Thus according to one feature of this invention one binary value, say a "1," is represented in the storage cell by like conditions of remanent magnetization of the cores of a particular polarity. The other binary value, in this case, a "0," is represented in the cell by unlike conditions of remanent magnetization of the cores of particular opposite polarities.

According to another feature of this invention the parallel branch circuit including a winding of each core of the cell is provided as a means of accomplishing both the writing and the reading operation. Assuming initially no magnetization in the cores of a cell, when a series of write current pulses of the same polarity and sufficient magnitude are applied to the branch circuit, the current will divide substantially equally and both cores of the cell will be driven to conditions of magnetic saturation of the same polarity to represent the binary "1." Obviously the polarity of the applied current pulses must be suitably selected so that the cores will be driven to the magnetic polarity selected to represent the binary "1."

Another feature of this invention provides for the writing into the cell of a binary "0." Connected to the second winding of the first core of the cell is a source of biasing current of a polarity and magnitude such as to drive and hold the first core in a condition of magnetic saturation of a polarity opposite to that of the condition to which the write current pulses applied to the branch circuit tend to drive the second core of the cell. As a result, upon the completion of the write phase, the cores will have assumed unlike conditions of magnetic remanence, that is, of particular opposite polarities representative of a binary "0." Obviously the particular opposite polarities resulting will again depend upon the polarity of the applied write current pulses and also that of the biasing current.

According to the read-out aspect of this invention the non-destructive feature thereof comprises the second winding of the second core of the cell and the application of a series of read-out current pulses of alternate polarity to the parallel branch circuit of the cell. When such a stries of pulses is applied to the branch circuit and the cell has contained therein a binary "1," the current of either polarity will divide substantially evenly since the impedances in the two core windings will be substantially equal in either case. Thus a current pulse of one polarity will drive both cores further into saturation and a current pulse of the other polarity will switch both cores to the opposite condition of remanent magnetization. A succeeding read-out current pulse of again opposite polarity will switch both cores back to the original like conditions of remanent magnetization representative of the binary "1." Since in the case of a stored binary "1" both cores switch, a read-out winding may be inductively coupled to either core. However, the second winding of the second core above mentioned is advantageously employed for this purpose thus maintaining the physical symmetry of the storage cell. The switching of the second core in both directions induces voltage signals in that second winding in the conventional manner, which signals may be detected by well-known associated information utilization circuits.

If a binary "0" is stored in a cell the applied read-out current pulses will again divide between the windings of the cores. However, since the cores are now oppositely magnetized, the windings will present unequal impedances to current pulses of either polarity and the winding having the lowest impedance will draw the larger part of the current. This winding will be the one coupled to the core already in the condition of remanent magnetization to which the applied current pulse tends to drive it. The part of the current passing through the winding of the other core, on the other hand, will be of insufficient magnitude to completely switch that core and the latter core thus switches only slightly. In either case only negligible noise signals will be induced in the second or output winding of the second core. The absence of a full magnitude output signal thus indicates the presence in the cell of a binary "0."

According to still another feature of this invention the basic storage cells above described are readily arranged in a coordinate array to achieve a memory matrix capable of storing a number of information bits. Thus the rows of such an array advantageously comprise a plurality of cells, the branch circuits of which are connected in series-parallel fashion. The full magnitude write or read-out current pulses may then be applied to each cell of a row, with the current dividing in each cell as determined by the magnetic conditions of its cores. The second windings of corresponding cores of each cell are connected in series as are the second windings of the corresponding other cores of each cell to form the biasing and read-out circuits, respectively, of the columns of the array.

According to another aspect of this invention, it is a further feature thereof that conventional, critical coincident currents are advantageously not required to provide the necessary switching magnetomotive forces. Thus for the read-out of both binary values and the writing of a binary "1" no coincidence of currents at all is required; row switching current pulses alone are sufficient to perform these operations. Only for the writing of a binary "0" is an additional current required as described above and this current need only be sufficient to maintain a core in a particular condition of magnetic remanence; the amplitude thus being completely uncritical. The principles of this invention as generally described in the foregoing may also be advantageously practiced in connection with a magnetic matrix taking the form of a perforated magnetic sheet or plate. Such a matrix is described and claimed, for example, in the copending application of R. L. Ashenhurst and R. C. Minnick, Serial No. 401,465, filed December 31, 1953, now Patent No. 2,912,677, granted November 10, 1959. Since in actual practice the coupling described above as achieved by windings would be achieved by merely threading the cores with suitable conductors, such a perforated sheet would be used with particular advantage since only two conductors would thread each aperture in the plate.

The foregoing and other objects and features of this invention together with its organization and structure will be better understood from a consideration of the detailed description thereof which follows when taken in conjunction with the accompanying drawing, in which.

Figure 2:
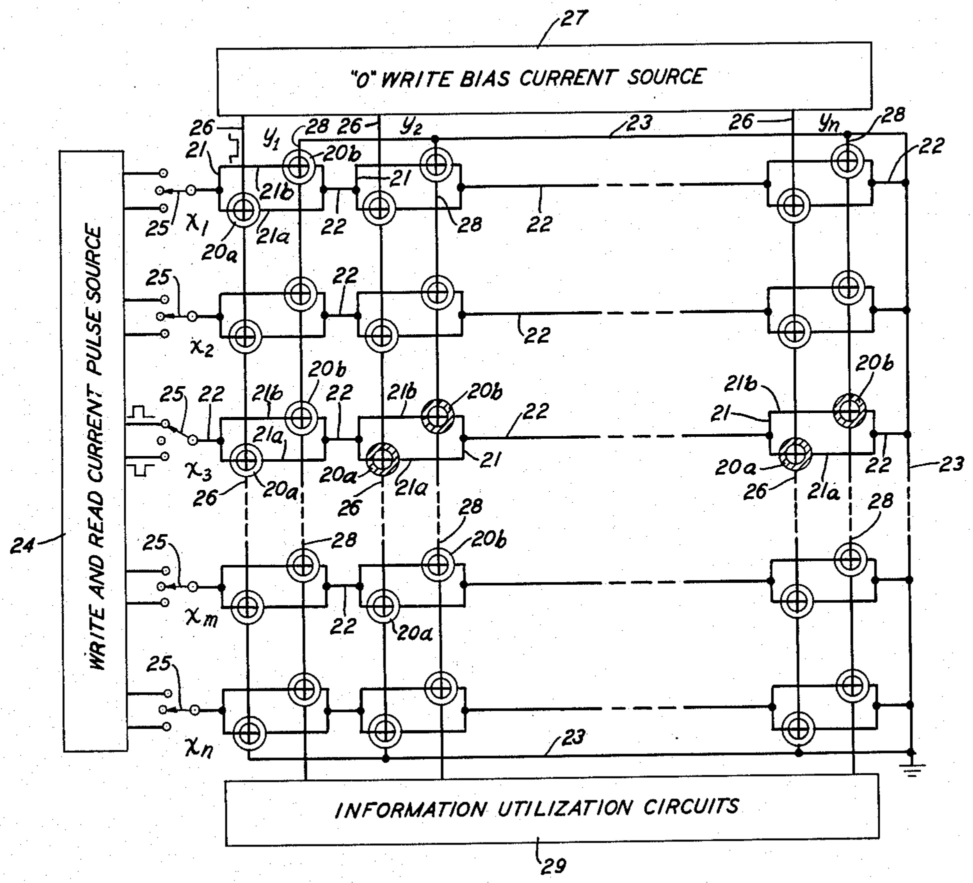
FIG. 2 is a schematic presentation of an illustrative information storage matrix utilizing as basic storage units thereof a storage cell according to this invention.
Figure 1:
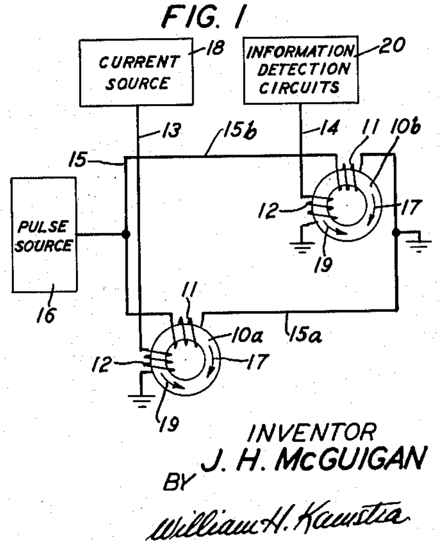
FIG. 1 is a schematic presentation of an illustrative information storage cell according to the principles of this invention.

A magnetic memory matrix shown in FIG. 2 of the drawing may be built up from a number of the illustrative basic storage cells shown in FIG. 1 and the principles of this invention may be comprehended from a description of the cell. Such a cell comprises a pair of magnetic cores 10*a* and 10*b* which may advantageously be of the conventional toroidal type and of a ferromagnetic material displaying substantially rectangular hysteresis characteristics well known in the art. Each of the cores 10*a* and 10*b* has inductively coupled thereto a first and a second winding 11 and 12, respectively. The winding 12 of the core 10*a* is included in series with a conductor 13 and the winding 12 of the core 10*b* is included in series with a conductor 14. The windings 11 of the cores 10*a* and 10*b* are serially connected together in a loop circuit 15 which loop circuit in turn is connected between a pulse source 16 and ground in a series-parallel fashion. A circuit is thus established between the source 16 and ground which has a pair of parallel branches 15*a* and 15*b* included therein. The parallel branches 15*a* and 15*b* in turn include the windings 11 of the cores 10*a* and 10*b*, respectively. For purposes of describing generally the principles of operation of the illustrative storage cell of FIG. 1 it will be assumed that the pulse source 16 provides current pulses of suitable magnitude and polarity necessary for the operations to be described. Such current sources are well known in the art and need not be described in detail at this point.

Assuming no initial magnetization in either of the cores 10*a* or 10*b*, if a negative current pulse of suitable magnitude is applied from the source 16, the current will divide substantially equally between the two branches 15*a* and 15*b*. The sense of the windings 11 with respect to each core 10*a* and 10*b* is to be understood as being the same, with the result that the cores 10*a* and 10*b* will be driven to like conditions of magnetic saturation by the substantially equal magnetomotive forces generated by the divided current pulse. The like magnetic conditions are represented in FIG. 1 by the arrows 19. Obviously the application of a positive current pulse to the circuit 15 would also result in like conditions of magnetic saturation in the cores 10*a* and 10*b* but in a polarity opposite to that represented by the arrows 19. At this point two distinct stable states are thus available in the cell which may be utilized to represent information stored: one state with the like magnetizations of the cores in one direction and the other state with the like magnetizations in the opposite direction. For purposes of describing the principles of this invention, the state of the cell in which the conditions of like magnetization produced by a negative applied current pulse as represented by the arrows 19 will be selected as representative of a stored binary information value "1."

The magnetic condition of either of the cores 10*a* or 10*b* can also be controlled by the application of current pulses to its winding 12. Thus a negative current pulse of suitable magnitude applied to the upper terminal of the conductor 13 from another suitable source of current 18, and thus to the winding 12 of the core 10*a*, will also result in a condition of magnetic saturation as represented by the arrow 19. If a positive current pulse of sufficient magnitude is now applied from the source 16 substantially simultaneously with the application of a negative current pulse from the source 18 to the conductor 13, the core 10*b* will be switched to a condition of magnetic saturation as represented by the arrow 17 and the core 10*a* will be held in its magnetic condition as represented by the arrow 19. The latter condition is opposite in direction to that to which the positive current pulse in the winding 11 of the core 10*b* drives the latter core and the removal of the current pulses thus leaves the cores 10*a* and 10*b* in unlike conditions of magnetic saturation. By reversing the polarities of the holding current pulse applied to the conductor 13 and the current pulse applied to the loop circuit 15, the polarities of the unlike magnetic conditions of the cores 10*a* and 10*b* may also obviously be reversed. Two additional distinct stable states are thus made available in the cell which states may also be utilized to represent stored information. For purposes of describing this invention the state of the cell in which the polarities of the unlike magnetization as produced by a negative holding or biasing current and a positive writing current and as represented by the arrows 19 and 17 in the cores 10*a* and 10*b* respectively will be selected as representative of a stored binary information value "0."

The immediately foregoing description has been provided to establish a convenient manner in which an initial "0" or "1" state of a cell may be attained. In the subsequent operation of the illustrative storage cell being described, interrogation or read out is contemplated as being accomplished by a series of alternating positive and negative current pulses of suitable magnitude applied to the loop circuit 15. Assuming a binary "1" to be contained in the cell, that is, each core 10*a* and 10*b* being magnetized in the same direction as represented by the arrows 19, when a positive current pulse of a read-out cycle is applied to the circuit 15, the current will divide substantially equally between the branches 15*a* and 15*b* because of the substantially equal impedances presented by the windings 11 of the cores in those branches. Since the cores 10*a* and 10*b* are in remanent magnetic conditions opposite in direction to which the positive current pulse in the branches tends to drive them, both will switch to the opposite remanent condition as represented by the arrows 17. On the succeeding negative pulse the current again divides substantially equally and both cores switch back to the original remanent magnetic conditions as represented by the arrows 19. Succeeding positive and negative current pulses again switch and reswitch the cores and, in response to the repetition of the application of the positive and negative current pulses, the cell eventually arrives at a steady state in which each of the cores 10*a* and 10*b* switches substantially completely at each pulse.

When a positive current pulse of the interrogating cycle is applied to a cell in the "0" state, that, is the state in which the core 10*a* is in the magnetic condition as represented by the arrow 19 and the core 10*b* is in the magnetic condition as represented by the arrow 17, the current will again divide between the branches 15*a* and 15*b* of the circuit 15. This time, however, unequal impedances will be presented by the windings 11 due to the unlike remanent magnetic conditions of the cores 10*a* and 10*b*. Since the core 10*a* is in a remanent condition opposite in polarity from that to which the applied positive current pulse tends to drive it, its winding 11 presents a relatively large impedance. The core 10*b* is already in a remanent condition of a polarity to which the applied positive current pulse tends to drive it and accordingly its winding 11 presents a relatively low impedance. The positive current pulse will thus divide in a manner such that the largest proportion is conducted through the winding 11 of the core 10*b* with the result that the core 10*b* will merely be driven further into saturation. The smaller proportion of the current conducted through the winding 11 of the core 10*a* will cause the latter core to switch only slighly. The remanent magnetization of neither of the cores will accordingly be materially affected by the applied positive current pulse since no complete switching occurs. When a succeeding negative current pulse of the series is applied to the circuit 15, the relative magnitudes of the impedances presented are reversed. As a result, the core 10*a*, the winding 11 of which now presents a relatively low impedance, will be driven back to its condition of remanent magnetization from which it was partially driven, and the core 10*b*, the winding 11 of which now presents a relatively high impedance, will be switched only slightly. In this case again no complete switching of the cores occurs. In response to repeated application of the alternating positive and negative current pulses to the loop circuit 15, the storage cell arrives at a steady state in which only a small excursion of the remanent flux in the cores takes place on each pulse.

In recapitulation, during the interrogation phase of operation of the storage cell, if a binary "1" is stored in the cell, both of the cores 10*a* and 10*b* will switch substantially completely upon each application of a positive and of a negative current pulse. If a binary "0" is stored in the cell, neither of the cores 10*a* nor 10*b* will be completely switched. The winding 12 inductively coupled to the core 10*b* and serially included in the conductor 14 provides a convenient means for detecting the particular representative state of the storage cell. Obviously since both of the cores 10*a* and 10*b* behave in a substantially similar manner with respect to the excursion of the remanent flux on the hysteresis loop whether a binary "1" or a "0" is stored in the cell, either of these cores could be utilized for read-out purposes. If a binary "1" is stored in the cell, the core 10*b* will alternately switch from one stable condition of remanent magnetization to the other upon the alternate application of positive and negative read-out current pulses. As a result, a series of alternating positive and negative voltage pulses will be induced in its winding 12. These output voltage signals of alternating polarity appearing on the conductor 14 are thus indicative of the presence in the cell of a binary "1" and may be detected by means of associated circuits 20 well known in the art.

Obviously no effective destruction of the information value "1" has taken place since a complete switching occurs at each alternating current pulse. Since it is the like conditions of magnetic remanence of the cores of a cell which are representative of a binary "1," in this embodiment the like conditions of either polarity will serve this purpose. Thus the like conditions represented in the drawing by the arrows 17 could as well be representative of a "1" when interrogated by the negative pulse. If the cell has a binary "0" stored therein the core 10*b* selected to generate the read-out signal either switches only slightly or is driven further into saturation by the applied current pulses and accordingly only negligible output voltages will be induced in the conductor 14. The absence on the read-out conductor 14 of a series of alternating full magnitude voltage pulses is thus indicative of the presence in the cell of a binary "0." Again no destruction of this information has taken place, in this case, for the reason that no complete reversal of the remanent magnetization of either core has occurred.

Alteration of information stored in a storage cell is accomplished in a manner similar to that described hereinbefore for the initial introduction of information into the cell. Assuming a storage cell to be in the "0" state, as described above for the interrogation phase, the flux of each core is made to traverse only a small portion of its hysteresis loop in response to the application of each alternating pulse to the circuit 15. The extent of the flux excursion is small but advantageously not completely negligible. When the state of the cell is to be changed from a "0" to a "1," that is, from a state represented by the arrows 19 and 17 to a state represented by the arrows 19 alone of the cores 10*a* and 10*b*, respectively, a series of pulses of one polarity are applied to the circuit 15 and the excursions of the flux in the core which is presently in the condition of magnetic remanence opposite to that to which the pulses tend to drive it will be cumulative. Thus if positive pulses are used for writing purposes this core will be the core 10*a* since it was magnetized as represented by the arrow 19 in FIG. 1 and it alone will be switched to match the condition of the core 10*b*. The cores 10*a* and 10*b* are now in like magnetic conditions which may be regarded as the interrogated stage of a binary "1" in the cell. Advantageously negative writing pulses may also be used to alter the conditions of the core to realize a "1" state in the cell. In this case both cores will be left in the magnetic conditions as represented by the arrows 19 and as earlier selected herein to be directly representative of a "1." A negative pulse following the positive writing pulses will obviously also bring both cores to the conditions represented by the arrows 19. A terminating negative pulse thus leaves the cores in a condition of remanent magnetization originally selected to represent a "1" just as was the case with the terminating negative pulse of the interrogating series of positive and negative pulses above described.

Obviously, the application of either a series of positive or a series of negative pulses, as described for the alteration of the state of a cell from a "0" to a "1," could also have been used to introduce an initial "1" into a cell, the cores of which have not been previously magnetized. The single, relatively longer current pulse assumed for the initial magnetization conveniently served to simplify the description of this invention. However, it is to be understood that such a single longer current pulse could also be used to accomplish the alteration of the cell from a "0" to a "1" state. Short current pulses may on the other hand be more advantageously developed. Thus, it may be convenient to merely suppress the pulses of one polarity of the series of alternating positive and negative interrogating pulses to provide the "1" writing current pulses. No new pulse of different characteristics need then be supplied.

To alter the state of the cell of FIG. 1 from one representing a binary "1" to one representing a binary "0" the operation is substantially similar to that described for the alteration described above. However, the holding or biasing current is now applied to the conductor 13. To achieve a state of unlike magnetizations of the cores 10*a* and 10*b* as represented by the arrows 19 and 17 in FIG. 1, a series of positive write pulses are applied to the circuit 15 from the source 16 and, simultaneously, a negative holding current is applied to the conductor 13 from the source 18. The holding current is of a magnitude sufficient to hold the core 10*a* in its condition of magnetic remanence as represented by the arrow 19 in FIG. 1. Since the alteration here contemplated is that from a "1" state to a "0" state the actual operative effect of the applied positive current pulses or the simultaneous biasing current will depend upon the particular like magnetic conditions in which the cores have been left by previous interrogating current pulses. It will be assumed however that the last interrogating or write pulse applied to the circuit 15 was negative as previously described and that the cores 10*a* and 10*b* are in a magnetic condition represented by the arrows 19. The biasing current will thus merely insure the magnetic condition of the core 10*a* as that represented by the arrow 19 and the positive current pulses will switch the core 10*b* to the magnetic condition represented by the arrow 17. The effect of the applied writing currents will obviously be reversed should the cores 10*a* and 10b have been left in like magnetic conditions as represented by the arrows 17.

The organization and operation of a single two-core information storage cell according to the principles of this invention has been described in the foregoing. A memory matrix advantageously constructed from a plurality of such storage cells is depicted in FIG. 2. A plurality of storage cells each comprising a pair of magnetic cores 20*a* and 20*b* are arranged in rows and columns to present a coordinate array of cells. The magnetic cores in this illustrative matrix may also be of the conventional toroidal type and the matrix as herein to be described is considered as word-organized. A plurality of rows $x_1$, $x_2$, $x_3$, . . . $x_m$, $x_n$ and columns $y_1$, $y_2$, . . . $y_n$ are shown, and it is to be understood that the array may comprise any number of rows and columns consistent with the capabilities of the associated circuitry and the requirements of the system in which the matrix is to be used. The cores 20*a* and 20*b* of each cell are serially threaded by a loop circuit 21 in a manner such that each core is threaded respectively by a branch conductor 21*a* and 21*b* of the circuit 21. The loop circuits 21 are serially connected in each row by a plurality of connecting conductors 22 with the result that each of the rows $x$ comprises a series of parallel circuits terminating in a ground bus 23. Thus any current applied at the other terminus will be conducted to the ground bus 23 through each of the loop circuits 21 of a row, the current dividing at the branches 21*a* and 21*b* of each circuit 21 as determined by the relative impedances of the branches.

Operating currents are supplied to each of the rows $x$ by a source of write and read current pulses 24. The source 24 may be any of the conventional current pulse sources well known in the art. The particular pulse source here contemplated generates a series of positive current pulses and a series of negative current pulses of suitable magnitude, each of which series are alternately available for application to selected rows of the matrix. In addition, in the illustrative matrix being described and in accordance with the principles of this invention previously stated, the writing phase of operation requires the application of a series of positive current pulses to a selected row from the source 24. A source 24 such as that here contemplated may readily be devised by one skilled in the art and may advantageously comprise a sequential switch also employing magnetic cores. The manner of controlling the application of the alternating positive and negative current pulses for interrogation and the application of a continuing series of positive current pulses for the writing operation is symbolized in FIG. 2 by a three-position switch 25 for each row. Although in actual practice such a switching and control operation would be performed integrally with the control of the access circuitry generally, the switch 25 provides a convenient means of describing the operation of the structure to which this invention is limited. Thus with the switch 25 of a typical row $x_3$ in the position as shown in FIG. 2, that is, on the upper contact, a positive current is to be presumed as being applied to the series-parallel loop circuits 21 of that row. The positions of the switches 25 of the other rows are in a normal position, that is, one in which no current is being supplied to the associated row. A switch 25 on the lower contact will be presumed to apply a negative current to the associated row.

The cores 20*a* of each of the cells of each of the columns $y$ have inductively coupled thereto by threading a conductor 26. Each of the conductors 26 terminates at one end in the ground bus 23 and at the other end in a source of write biasing current 27. Such a source 27 is also well known in the art and produces a negative current which may advantageously be continuing during the "0" write operation to reduce critical aspects of operation in a manner to be described hereinafter. The cores 20*b* of each of the cells of the columns have inductively coupled thereto by threading a conductor 28. Each of the conductors 28 terminates at one end in the ground bus 23 and at the other end in an associated information utilization circuit 29. Circuits of the character contemplated as comprising the circuit 29 are capable of discriminating between the alternating voltage signal outputs representative of a binary "1" and mere shuttle voltages constituting effectively an absence of signal representative of a binary "0" and are also well known in the art. Since a detailed description of the circuits 24, 27, and 29 is unnecessary for a complete understanding of the principles of this invention such a description is not here provided in view of the conventional nature of the circuits.

Since the illustrative matrix being described is considered to be word organized, each of the cells of each of the rows, for example, the typical row $x_3$, contains an information bit which may be either a binary "1" or a binary "0." Assume, for purposes of description, that the typical row $x_3$ has contained therein a word having the characters 0, 1, . . . 1 stored therein. The binary "1's" are represented in FIG. 2 by the shaded cores of a cell. Reading or interrogation of the row $x_3$ is accomplished by the application of a cycle of an alternating positive and a negative current pulse from the source 24 under control of the symbolic switch 25 which switch is assumed to be operating between its upper and lower contacts to apply the pulses of alternating polarity to the conductor 22 of the row $x_3$. The switches 25 are further assumed to be operable either sequentially or on a selective basis. A positive current pulse applied to the conductor 22 of row $x_3$ will divide in the branches 21*a* and 21*b* of the cell of column $y_1$ as determined by the impedances of the branches threading the cores 20*a* and 20*b*. Since this cell contains a binary "0" the cores are in conditions of unlike magnetization and accordingly different impedances are presented to the positive current pulse. The current will therefore divide unequally in the branches 21*a* and 21*b*, and, as previously explained in connection with the description of the individual cell of FIG. 1, neither core will be completely switched. The slight excursion of the flux in these cores will be manifested in the read-out conductor 28 of column $y_1$ by negligible noise or shuttle voltages; the absence of a full-valued output voltage is detectable by the circuits 29 as representative of the binary "0" stored in the cell defined by the coordinates $x_3$, $y_1$.

The positive current pulse is also applied to the loop circuit 21 of the storage cell of row $x_3$ and column $y_2$. This storage cell however has a binary "1" stored therein and hence both cores are magnetized in like polarities with the branches 21*a* and 21*b* presenting substantially equal impedances. The polarities are opposite to that of the applied magnetomotive force and the positive current pulse will accordingly switch both of the cores. A full-valued output voltage will, as a result, be induced in the read-out conductor 28 of column $y_2$ detectable by the circuits 29 as representative of a binary "1." The positive current pulse is finally also applied to the loop circuit 21 of the storage cell in the position of row $x_3$ and column $y_n$. Since this cell also stores a binary "1," the same operation is repeated here on the application of the positive interrogating pulse and a full-valued output voltage is induced in the read-out conductor 28 of column $y_n$ also representative of a binary "1."

Upon the following negative current pulse the read-out operation with respect to row $x_3$ will be substantially similar to that described for the positive current pulse. Only slight excursions of the flux in the cores 20*a* and 20*b* will occur in the cell of column $y_1$ as the result of the unequal division of the current and complete switching of the cores 20*a* and 20*b* will occur in the cells of columns $y_2$ and $y_n$ as the result of the substantially equal division of the current. Again only shuttle or noise voltages will be induced in the read-out conductor 28 of column $y_1$ and full output voltages will be induced in the read-out conductors 28 of columns $y_2$ and $y_n$, although in this case the latter voltages will be reversed in polarity. As a result of the application of a single interrogation pulse cycle, that is, a positive and a negative pulse, the cores of the cells containing binary "0's" have been substantially unaffected and the cores of the cells containing binary "1's" have been switched and restored to their original remanent magnetic conditions. In either case the parallel read out will be directly representative of the information bits of the word stored in the row interrogated in terms of the presence or absence of full-valued output signals of either polarity.

The description of the read out or interrogation operation for the typical row $x_3$ may be understood as directly applicable to the other rows of the matrix either on a sequential or random access basis. As previously described in connection with the description of the storage cell of FIG. 1, the writing or information alteration phase of operation is accomplished by the application to a row $x$ of a series of pulses of one polarity—in the illustrative embodiment being described, pulses of positive polarity. To apply such pulses from the source 24 the symbolic switch 25 of row $x_3$ may be understood as held on the contact as shown in FIG. 2. On the biasing conductors 26 of those columns $y$ defining the cells of the row $x$ in which binary "0's" are to be written, negative biasing currents are selectively applied from the source 27 substantially simultaneously with the application of the positive current pulses applied to the selected row. As previously explained, the biasing current may be either a steady current or it may be in the form of current pulses applied substantially concurrently with the positive write pulses, and the biasing current maintains the cores 20*a* in their respective magnetic conditions. The applied positive current pulses are thus effective to switch only the cores 20*b* of the cells of the row to contain binary "0's." A manner of current coincidence is thus required only to write into a cell a binary "0" and for no other operation. The cores 20*a* and 20*b* of the cells to which no biasing current is applied will of course be driven, or switched, to like conditions of magnetic remanence representative of what may be considered the interrogated stage of a binary "1." The latter condition is subsequently switched by a terminating negative pulse thereby leaving the cores of the "1" cell in like magnetic conditions of a polarity established hereinbefore as representative of a binary "1." The negative biasing current applied from the source 27 advantageously leaves the cells of the other rows unaffected since in every case the cores of those cells will be in the magnetic condition to which the biasing current tends to drive them.

Figure 3:
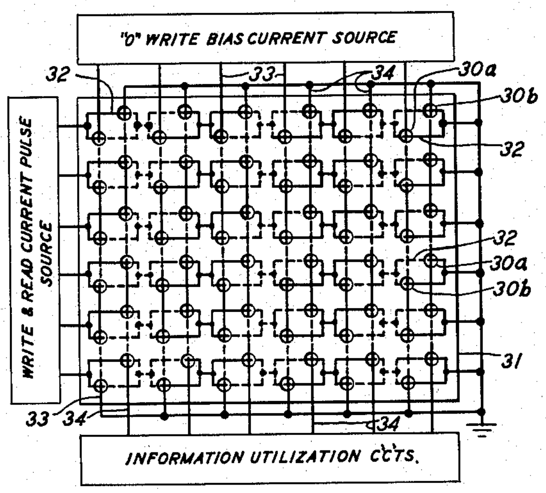
FIG. 3 illustrates the application of the principles of this invention to a magnetic memory matrix comprising a magnetic plate.

In FIG. 3 is shown a magnetic memory matrix according to the principles of this invention and identical in operation to the illustrative matrix shown in FIG. 2 and described above. Instead of conventional toroidal magnetic cores, however, the matrix of FIG. 3 employs as individual storage elements of the cells discrete magnetic areas defined by apertures in a magnetic plate. Such a magnetic apertured plate having substantially rectangular hysteresis characteristics is described in detail in the copending application of R. L. Ashenhurst et al., referred to hereinbefore. Thus the matrix of FIG. 3 comprises a plurality of pairs of apertures 30*a* and 30*b* in a magnetic plate 31 defining an illustrative 6×6 array. Loop circuits 32 serially thread the pairs of apertures 30*a* and 30*b* defining the cores of the storage cells, and biasing and read-out conductors 33 and 34 also thread the apertures 30*a* and 30*b*, respectively, in a manner similar to that described for the matrix of FIG. 2.

One immaterial difference from the matrix of FIG. 2 is apparent from the manner in which the threading operation is accomplished. Since the cores in the matrix of FIG. 3 constitute the areas immediately encompassing the apertures 30*a* and 30*b* it is inconvenient to arrange the threading in the same direction for corresponding core apertures. Thus the conductors 33 and 34 and the loop circuits 32 will alternate in the directions in which they thread adjacent apertures, the conductors appearing first on one side of the plate 31 and then on the other side. This arrangement advantageously will have no effect on the operation of the matrix since whatever the polarities of the magnetizations of the core-apertures may be, it is the like and unlike character of the magnetizations of a core pair which represents the stored information and controls the nature of the output signals. Thus no matter what the particular polarities of the like and unlike magnetizations assigned to represent the binary values, the presence of full-valued output signals of whatever sequence of polarities will always indicate the presence of a binary "1." In this connection it should further be understood that the like and unlike magnetic conditions, strictly speaking, refer rather to the manner in which the magnetic conditions are affected by the applied magnetomotive forces. Thus the effect of the magnetomotive forces depends upon the sense of the windings, and the literal reading of the polarities of the cores as represented in FIG. 1 by the arrows 17 and 19 has been given only for convenience of description. Since the operation of the matrices of FIGS. 2 and 3 are identical, reference may be had to the foregoing detailed description for a description of the operation of the matrix of FIG. 3.

Both of the illustrative embodiments of the matrices described above according to the principles of this invention lend themselves advantageously to simple and convenient methods of fabrication. Thus the loop circuits 21 and 32 of the rows of the matrices of FIGS. 2 and 3, respectively, may conveniently be formed by threading corresponding cores or apertures of the rows with individual conductors, the conductors then being joined, for example, by spot welding between the cells. The joining of the conductors to form the loop circuits may also conveniently be accomplished by providing bridges between the parallel conductors between the cells. The matrix of FIG. 3 is also readily adapted to deposited-conductor wiring, this particularly in view of the fact that only two conductors at most thread any one core-aperture.

What have been described are considered to be only illustrative embodiments of the principles of this invention and it is to be understood that numerous other arrangements may be devised by one skilled in the art without departing from the spirit and scope of this invention.

What is claimed is:

1. A magnetic information storage circuit comprising a first and a second magnetic element, each having a substantially rectangular hysteresis characteristic thereby being capable of assuming two opposite conditions of remanent magnetization, a first and a second winding inductively coupled to each of said elements, circuit means having a pair of parallel branches, each of said branches including one of said first windings, write means for setting said first and said second elements to the same and opposite conditions of remanent magnetization representative of information to be stored comprising means for applying current pulses to said circuit means and means for applying biasing current to the second winding of said first element concurrently with said current pulses; read-out means comprising means for applying other current pulses of alternating polarity to said circuit means and output means comprising the second winding of said second element.

2. A magnetic information storage circuit comprising a first and a second magnetic core having a substantially rectangular hystersis characteristic, a first winding for each of said cores, circuit means having a pair of parallel branches, each of said branches including one of said first windings, means for applying first current pulses to said circuit means to induce magnetizations of one polarity in both of said cores representative of one information value, a second winding for each of said cores, means for applying a biasing current to the second winding of one of said cores simultaneously with said first current pulses applied to said circuit means, said biasing current being of a polarity to induce a magnetization of the opposite polarity in said one core representative of another information value, and means for applying other current pulses of alternating polarity to said circuit means to switch the magnetization of said cores when said cores are both magnetized in said one polarity to induce voltage pulses of alternating polarity in the second winding of the other of said cores.

3. A magnetic information storage circuit comprising a magnetic plate having a susbtantially rectangular hysteresis characteristic, said plate having a first and a second aperture therein defining respectively a first and a second magnetic core, a first and a second conductor respectively threading said first and second apertures, circuit means having a pair of parallel branches, said branches including respectively said first and said second conductors, means for applying first current pulses to said circuit means to induce magnetizations of one polarity in both of said cores representative of one information value, a third conductor threading one of said apertures, means for applying a biasing current to said third conductor simultaneously with said first current pulses to induce a magnetization in said one core in the opposite polarity representative of another information value, a fourth conductor threading the other of said apertures, and means for applying other current pulses of alternating polarity to said circuit means to switch the magnetizations of said cores when said cores are both magnetized in said one polarity to induce voltage pulses of alternating polarity in said fourth conductor.

4. A magnetic information storage circuit comprising a first and a second core means, each having a substantially rectangular hysteresis characteristic, means for inducing first remanent magnetizations in said first and said second core means representative of a first information value comprising circuit means having a pair of branches each including respectively a first winding for each of said cores, means for applying a read-out current of alternating polarity to said circuit means, said first windings each being in a sense such that said read-out current switches both said first and said second core means, and an output circuit means including a second winding for one of said core means for generating an output signal of alternating polarity representative of said first information value responsive to the switching of said one core means.

5. A magnetic information storage circuit as claimed in claim 4 also comprising means for inducing second remanent magnetizations in said first and second second core means representative of a second information value comprising said circuit means, means for applying a write current to said circuit means, a second winding for the other of said core means, and means for applying a biasing current to the second winding of said other core means, said second remanent magnetizations presenting impedances in said first windings such that said read-out current divides in said branches without switching either of said cores.

6. A magnetic information storage matrix comprising a plurality of pairs of magnetic core means, each of said core means having a substantially rectangular hysteresis characteristic, said pairs of core means being arranged in rows and columns, a plurality of pairs of first conductors inductively coupled respectively to the cores of said pairs of core means, a plurality of circuit means connecting adjacent ones of said pairs of first conductors of each of said rows in series-parallel, means for selectively applying first current pulses to the circuit means of one of said rows to induce magnetizations of one polarity in the pairs of core means of said one row representative of first information values, means for applying other current pulses of alternating polarity to the circuit means of said one row to switch repeatedly the magnetizations of said core means of said one row, and a plurality of third conductors inductively coupled in series to corresponding first core means of each of said pairs of core means of said columns, said third conductors having signals of alternating polarity induced thereon responsive to said magnetization switches.

7. A magnetic information storage matrix as claimed in claim 6 also comprising a plurality of fourth conductors inductively coupled to corresponding second core means of each of said pairs of core means of said columns, and means for selectively applying a biasing current to said fourth conductors simultaneously with said first current pulses to induce magnetizations in said second core means of particular ones of said pairs of core means of said one row in the opposite polarity representative of second information values.

8. A magnetic information storage matrix as claimed in claim 7 in which said magnetic core means comprise toroidal cores.

9. A magnetic information storage matrix as claimed in claim 7 in which said magnetic core means comprise cores defined by apertures in a magnetic plate.

10. A magnetic information storage circuit comprising a plurality of pairs of first and second magnetic cores, each of said cores having a substantially rectangular hysteresis characteristic, a first winding for each of said first and second cores, a plurality of circuit means for connecting the first windings of each pair of said first and second cores in a series of parallel circuits, means for applying first current pulses of one polarity to said series of parallel circuits to induce like magnetizations of one polarity in said pairs of first and second magnetic cores representative of first information values, means for applying second current pulses of alternating polarity to said series of parallel circuits to switch repeatedly the magnetization of said pairs of first and second cores, and a second winding for each of said cores, the second winding of each of said first cores having signals of alternating polarity induced thereon responsive to said magnetization switches.

11. A magnetic information storage circuit as claimed in claim 10 also comprising means for selectively applying a biasing current to the second winding of second cores of particular pairs of cores simultaneously with said first current pulses on said series of parallel circuits to induce magnetizations of the oposite polarity in particular ones of said second cores representative of other information values.

12. A magnetic information storage circuit comprising a plurality of first and second magnetic cores, each of said cores having a substantially rectangular hysteresis characteristic, a first winding for each of said first and second cores, a plurality of first circuit means each having a pair of parallel branches including respectively the first winding of a first and second core, means for selectively applying current pulses to said plurality of first circuit means to induce magnetizations of like polarity in particular pairs of first and second cores representative of one information value, a second winding for each of said first and second cores, second circuit means connecting the second windings of each of said first cores in series, means for applying a biasing current to said second circuit means for maintaining particular one of said first cores in the magnetic polarity opposite to that of said second cores representative of a second information value, means for selectively applying other current pulses of alternating polarity to said plurality of first circuit means to switch repeatedly the magnetizations of said first and said second cores when said first and said second cores have magnetizations of like polarities therein, and third circuit means connecting the second windings of each of said second cores in series, said third circuit means having a signal of alternating polarity appearing thereon responsive to said switching of said magnetizations in said second cores.

13. A magnetic information storage matrix comprising a plurality of storage cells arranged in rows and columns, each of said cells comprising a pair of magnetic cores, each of said cores having a substantially rectangular hysteresis characteristic, and a first and a second winding for each of said cores, said first windings of the cores of each cell being connected in a closed loop; a plurality of first circuit means for connecting the loops of each of said rows in series, means for selectively applying first current pulses of one polarity to the first circuit means of one of said rows for inducing like magnetizations in the cores of the cells of said one row representative of one information value, a plurality of second circuit means for connecting the second winding of corresponding first cores of said cells of said columns in series, means for selectively applying a biasing current to the second circuit means of said columns simultaneously with said first current pulses for inducing unlike magnetizations in the cores of particular ones of said cells of said one row representative of another information value, means for applying second current pulses of alternating polarity to the first circuit means of said one row to switch like magnetizations of the cores of said cells from one polarity to the other, a plurality of third circuit means for connecting the second winding of corresponding second cores of said cells of said columns in series, and means for detecting output signals appearing on said plurality of third circuit means responsive to the switch of said like magnetizations from one polarity to the other.

14. An information storage circuit comprising a pair of magnetic cores having first and second remanent magnetic states, an input circuit having a first and a second parallel branch including respectively first input windings inductively coupled in the same sense to said magnetic cores, both branches of said input circuit being capable of transmitting current of either polarity, means for establishing equal inductances in said first input windings representative of one information value comprising means for applying a first current pulse of a predetermined polarity to said input circuit means to induce like remanent magnetic states in said cores, and means for establishing unequal inductances in said input windings representative of another information value comprising a second input winding on one of said cores and means for applying a second current pulse of a polarity opposite to, and simultaneously with, said first current pulse to said second input winding for inducing unlike remanent magnetic states in said cores.

15. An information storage circuit as claimed in claim 14 also comprising read-out means comprising means for applying current pulses of alternating polarity to said input circuit and an output winding inductively coupled to one of said cores.

16. An information storage circuit comprising a pair of magnetic cores having first and second remanent magnetic states, means for setting said cores to like and unlike remanent magnetic states representative of a first and a second information value, respectively, and read-out means comprising a read-out circuit having a first and a second parallel branch including respectively first windings inductively coupled to said cores, said read-out circuit including both of said branches being capable of transmitting current of either polarity, means for applying current pulses of alternating polarity to said read-out circuit, and an output winding inductively coupled to one of said cores.

References Cited in the file of this patent

UNITED STATES PATENTS

| | | |
|---|---|---|
| 2,657,272 | Dimond | Oct. 27, 1953 |
| 2,700,150 | Wales | Jan. 18, 1955 |
| 2,779,934 | Minnick | Jan. 29, 1957 |
| 2,846,667 | Goodell et al. | Aug. 5, 1958 |
| 2,851,678 | Crane | Sept. 9, 1958 |
| 2,912,677 | Ashenhurst et al. | Nov. 10, 1959 |